Aug. 4, 1942.　　　　H. W. GOODALL　　　　2,291,802
SAFETY ATTACHMENT FOR HOSE COUPLINGS
Filed Nov. 30, 1940
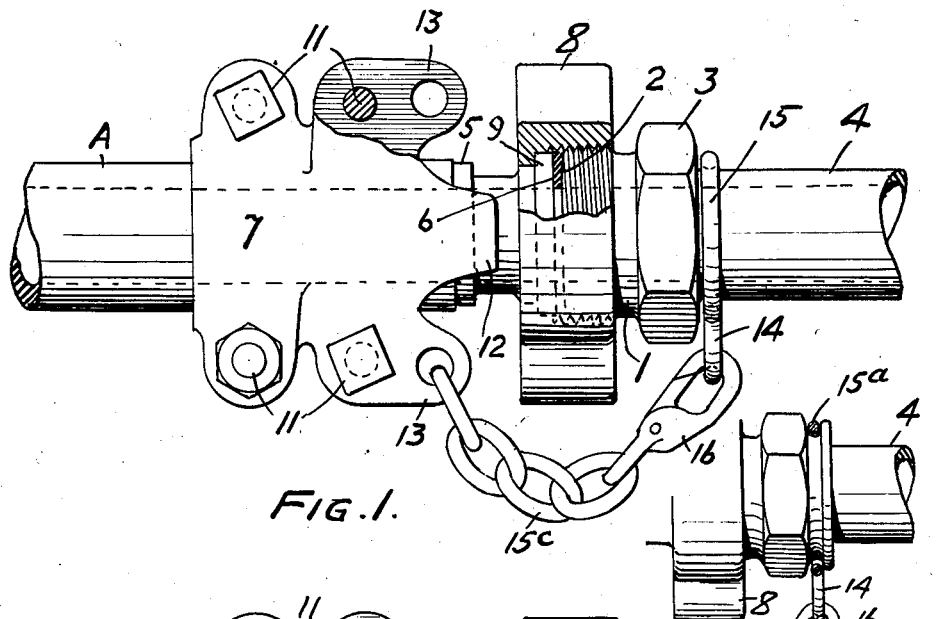
FIG. 1.
FIG. 3.
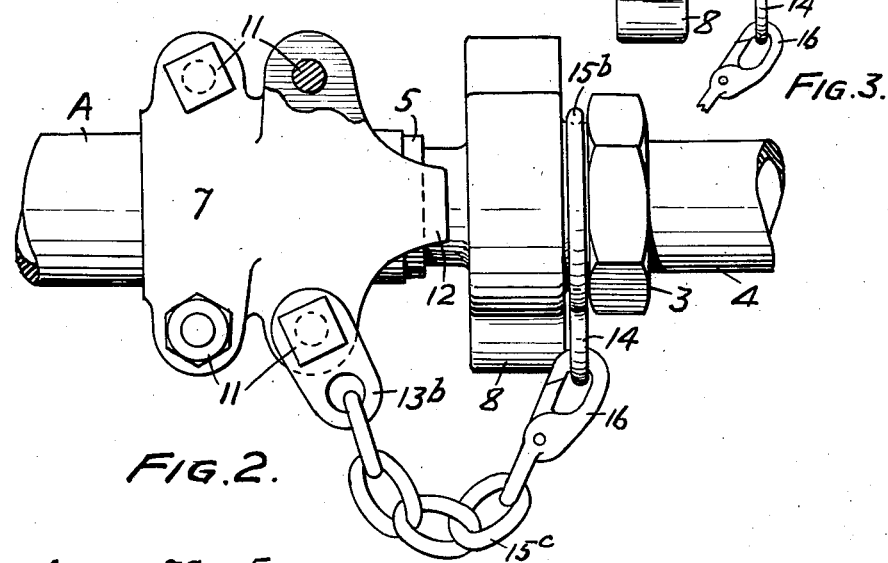
FIG. 2.
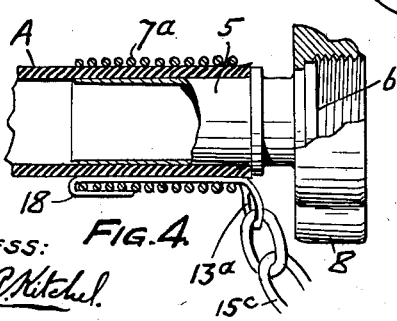
FIG. 4.
WITNESS:
INVENTOR
Howard W. Goodall
BY
Augustus B. Stoughton
ATTORNEY.

Patented Aug. 4, 1942

2,291,802

UNITED STATES PATENT OFFICE 2,291,802

SAFETY ATTACHMENT FOR HOSE COUPLINGS

Howard W. Goodall, Aldan, Pa.

Application November 30, 1940, Serial No. 367,925

1 Claim. (Cl. 285—120)

Couplings comprise a spud having a packing face and a polygonal shank, and a stem structure including a packing face and a hose end clamping means, and interposed between the spud and stem structure, a detachable connection comprising a thread and a wing nut. The spud is frequently attached to a relatively fixed element supplying pressure and the stem is attached to a flexible hose connected to a machine or otherwise subject to vibration. Vibration and other conditions sometimes cause the wing nut to back off and when that occurs the stem and its connections under pressure introduced through the spud are violently detached and cause personal injuries sometimes of a severe character.

Again in backing off the wing nut it is possible for the stem and its connections to be accidentally detached with the results above indicated.

The principal object of the present invention is to avoid the above mentioned defects and disadvantages and to provide a hose coupling with a safety attachment which will accomplish that result and which will not interfere with the normal coupling and uncoupling of the hose and which will be comparatively inexpensive.

Other objects of the invention will appear from the following description at the end of which the invention will be claimed.

The invention comprises the improvements to be presently described and finally claimed.

In the following description reference will be made to the accompanying drawing forming part hereof and in which, Figure 1 is a view with parts broken away of a coupling embodying features of the invention.

Figure 2 is a similar view illustrating a modification.

Figure 3 is a detached view illustrating another modification, and

Figure 4 is a sectional view illustrating another modification.

Referring to the drawing, 1 indicates a spud having a packing face 2 and a polygonal shank 3. 4 represents, for example, a compressed air, steam, or water pipe and it is usually fixed in respect to the other parts. 5 is a stem and it includes a packing face 6. Between the packing faces 2 and 6 there is indicated a washer-like packing. There are hose end clamping means shown in Figures 1 and 2 to include a pair of identical clamps 7. 8 is a nut. It is rotatably mounted on the stem by a flanged end 9 on the stem and it has thread or screw engagement with the spud 1 so that the nut serves to connect and disconnect the spud and the stem. As shown in Figure 1 the clamping means 7, including the bolts and nuts 11, serve to secure the hose A to the stem, and the clamping means are shown as provided with inturned hooks 12 which engage a flange on the stem.

There is nothing particularly new about the coupling above described and it is the backing off through accident or carelessness of the nut 8 which causes sudden separation of the spud and stem with the result that the hose end and stem flies in the air and sometimes causes personal injury.

A safety attachment embodying features of the invention will now be described. 13 is an eye fast on the stem structure. As shown in Figure 1 the eye 13 is provided in an integral part or extension provided on the clamp members and since the clamp members are duplicates two such eyes are provided. 14 is an eye mounted on the pipe, or on the spud structure connected with the pipe. As shown the eye 14 is a provision of swivel ring 15 which is mounted on the pipe 4 and held against movement toward the left in the drawing by the polygonal portion 3 of the spud. 15c is a chain attached at one end to the eye 13 of the stem structure and having at its other end a snap hook 16 attachable in and detachable from the eye 14. Inasmuch as the clamping means 7 have two eyes, the ring 15 may be provided with another eye and two chains may be employed. To couple and uncouple the hose A in respect to the element 3 the wing nut is turned in an appropriate direction and the described length of the chain permits this to be accomplished while the chain is attached to the eye 14 so that danger from the flying end of the hose and stem is avoided. In fact the wing nut may be turned with facility and without danger while the chain is attached to both eyes.

The construction and operation of the modifications shown and about to be described are as above set forth except in Figure 2 the extension of the clamp which carries the eye 13b is secured to the clamp by one of the bolts 11, and in that figure the ring 15b is mounted between the polygonal portion 3 of the spud and the thread which receives the wing nut, and in Figure 3 the ring 15a is mounted in a groove provided in the spud. As shown in Figure 4 the hose end A is attached to the stem by means of a wire or like wrapping 7a and the eye 13a is provided at the end of a hook like structure 18 held to place on the hose by means of the wrapping 7ª.

In all cases the polygonal portion 3 of the spud is provided in order to receive a wrench or like tool which is useful in applying the spud to the element 4 and in holding the spud against rotation when the wing nut is turned.

It is an advantage of the present invention that where it is used, for example with a compressed air line 4 and for example a pneumatic tool supplied with compressed air through the hose A, that when the pneumatic tool is moved from one place to another and connected with another compressed air outlet 4, the chain is connected with the hose and, therefore, is always available. Furthermore, the eye 13 in no way interferes with dragging the end of the hose along the floor. Again the eye is always available for attaching the spud to the chain.

I claim:

For use with the spuds of a compressed air line and the hose of a pneumatic tool having the stem provided with clamping means securing the hose end to the stem and also provided with a winged nut detachably securing the stem to one or another of the spuds, a safety attachment comprising, an eye on the clamping means radially fixed in respect to the axis of the hose, a swivel ring turnably mounted on the spud and provided with an eye turnable with the ring in respect to the axis of the spud into any radial position to correspond with any radial position assumed by the eye on the clamping means when the hose is applied to the spud, a chain attached at one end of the eye on the clamping means and transportable as a unit with the pneumatic tool and attachable and detachable in respect to the eye on the swivel ring when the latter is turned to a position substantially aligned with the other eye, the chain being long enough when attached to both eyes to clear the wings of the nut and short enough to permit of its attachment to the eye of the swivel ring when the latter is turned into position for substantially aligning both eyes.

HOWARD W. GOODALL.